United States Patent
Wells

Patent Number: 5,757,435
Date of Patent: May 26, 1998

[54] MPEG-2 INVERSE TELECINE CIRCUIT

[75] Inventor: Aaron Wells, New Rochelle, N.Y.

[73] Assignee: C-Cube Microsystems, Inc., Milpitas, Calif.

[21] Appl. No.: 569,782

[22] Filed: Dec. 8, 1995

[51] Int. Cl.⁶ .................................................. H04N 5/253
[52] U.S. Cl. ........................................ 348/441; 348/443
[58] Field of Search .................................. 348/441, 459, 348/97, 101, 443, 446, 449, 558; 386/46; H04N 5/253, 3/36, 9/11

[56] References Cited

U.S. PATENT DOCUMENTS

| | | | |
|---|---|---|---|
| 4,998,167 | 3/1991 | Jaqua | 348/443 |
| 5,191,427 | 3/1993 | Richards et al. | 348/443 |
| 5,255,091 | 10/1993 | Lyon et al. | 348/443 |
| 5,291,275 | 3/1994 | Lumelsky | 348/441 |
| 5,365,273 | 11/1994 | Correa et al. | 348/449 |
| 5,398,071 | 3/1995 | Gove et al. | 348/443 |
| 5,452,011 | 9/1995 | Martin et al. | 348/97 |
| 5,508,750 | 4/1996 | Hewlett et al. | 348/558 |
| 5,530,482 | 6/1996 | Gove et al. | 348/441 |
| 5,565,998 | 10/1996 | Coombs et al. | 386/46 |
| 5,594,552 | 1/1997 | Fujinami et al. | 348/446 |

*Primary Examiner*—Tommy P. Chin
*Assistant Examiner*—Luanne P. Din
*Attorney, Agent, or Firm*—Meltzer, Lippe, Goldstein, et al.

[57] ABSTRACT

A method and system for performing inverse telecine processing requires a minimum amount of memory capacity. Specifically, the inverse telecine processing technique requires only first and second dual field buffers. The first dual field buffer has a first even buffer (1E) and a first odd buffer (1O). The second dual field buffer has a second even buffer (2E) and a second odd buffer (2O). The input video sequence to be processed comprises a sequence of video fields of alternating even and odd parity. The even fields of the input sequence are written into the even buffers of the two dual field buffers on an alternating basis and the odd fields of the input sequence are written into the odd buffers of the dual field buffers on an alternating basis. This order is changed (i.e., toggled) when a repeat field is detected. The repeat field is dropped by writing over it with the next field of the same parity in the input sequence.

2 Claims, 4 Drawing Sheets

FIG. 4A

| FIELD TIME PERIOD | (1) FILM SRC FIELD | (2) VIDEO SRC FIELD | (3) CAPTURE FIELD | (4) 3:2 DECISION | (5) PP BUFFER | (6) COMMENT | (7) PHASE |
|---|---|---|---|---|---|---|---|
| (1) | S1A | V1A | 1E | x | x | | 0 |
| (2) | S1B | V1B | 1O | x | x | | 0 |
| (3) | S2A | V2A | 2E | WAIT | P1:1E,1O | | 0 |
| (4) | S2B | V2B | 2O | F1:1E,1O | ***** | 2:NO DROP | 0 |
| (5) | S2A | V3A | 1E | WAIT | P2:2E,2O | | 0 |
| (6) | S3B | V3B | 1O | F2:2E,2O,1E | ***** | 3:DROP V3A | 0 |
| (7) | S3A | V4A | 1E | WAIT | STALL | TOGGLE | 1 |
| (8) | S4B | V4B | 2O | WAIT | P3:1E,1O | | 1 |
| (9) | S4A | V5A | 2E | F3:1O,1E | ***** | 2:NO DROP | 1 |
| (10) | S4B | V5B | 1O | WAIT | P4:2E,1O | | 1 |
| (11) | S5A | V6A | 1E | F4:2O,2E,1O | ***** | 3:DROP V5B | 1 |
| (12) | S5B | V6B | 1O | WAIT | STALL | TOGGLE | 0 |
| (13) | S5A | V7A | 2E | WAIT | P5:1E,1O | | 0 |
| (14) | S6B | V7B | 2O | F5:1E,1O,2E | ***** | 3:DROP V7A | 0 |
| (15) | S6A | V8A | 2E | WAIT | STALL | TOGGLE | 1 |
| (16) | S7B | V8B | 1O | WAIT | P6:2O,2E | | 1 |
| (17) | S7A | V9A | 1E | F6:2O,2E | ***** | 2:NO DROP | 1 |
| (18) | S8B | V9B | 2O | WAIT | P7:1O,1E | | 1 |
| (19) | S8A | V10A | 2E | F7:1O,1E | ***** | 2:NO DROP | 1 |
| (20) | S9A | V10B | 1O | WAIT | P8:2O,2E | | 1 |
| (21) | S9B | V11A | 1E | F8:2O,2E | ***** | 2:NO DROP | 1 |

FIG. 4B

| FIELD TIME PERIOD | (1) FILM SRC FIELD | (2) VIDEO SRC FIELD | (3) CAPTURE FIELD | (4) 3:2 DECISION | (5) PP BUFFER | (6) COMMENT | (7) PHASE | |
|---|---|---|---|---|---|---|---|---|
| (22) | S9A | V11B | 20 | WAIT | P9:10,1E | | 1 | |
| (23) | S10A | V12A | 2E | F9:10,1E,20 | ***** | 3:DROP V11B | 1 | |
| (24) | S10B | V12B | 20 | WAIT | STALL | TOGGLE | 0 | |
| (25) | S11A | V13A | 1E | WAIT | P10:2E,20 | | 0 | |
| (26) | S11B | V13B | 10 | F10:2E,20 | ***** | 2:NO DROP | 0 | |
| (27) | S11A | V14A | 2E | WAIT | P11:1E,10 | | 0 | |
| (28) | S12B | V14B | 20 | F11:1E,10,2E | ***** | 3:DROP V14A | 0 | |
| (29) | S12A | V15A | 2E | WAIT | STALL | TOGGLE | 1 | |
| (30) | S12B | V15B | 10 | WAIT | P12:20,2E | | 1 | |
| (31) | S13A### | V16A | 1E | F12:20,2E,10 | ***** | 3:DROP V15B | 1 | BAD SOURCE |
| (32) | S14B | V16B | 10 | WAIT | STALL | TOGGLE | 0 | |
| (33) | S14A | V17A | 2E | WAIT | P13:1E,10 | ORPHAN FIELD | 0 | PP BAD FRAME |
| (34) | S15B | V17B | 20 | F13:1E,10 | ***** | 2:SPLIT FRAME | 0 | |
| (35) | S15A | V18A | 1E | WAIT | P14:2E,20 | | 0 | PP BAD FRAME |
| (36) | S15B | V18B | 10 | F14:2E,20 | ***** | 2:SPLIT FRAME | 0 | |
| (37) | S16A | V19A | 2E | WAIT | P15:1E,10 | PHASE OK | 0 | |
| (38) | S16B | V19B | 20 | F15:1E,10 | ***** | | 0 | |

MPEG-2 INVERSE TELECINE CIRCUIT

FIELD OF THE INVENTION

The present invention relates to a method and circuit for detecting repeat fields in a sequence of video fields to be encoded using, for example, an MPEG-2 compatible encoder. Specifically, the present invention relates to the buffering of input video fields for repeat field detection during inverse telecine processing. The buffering is performed using only four field buffers, a significant reduction compared to conventional techniques.

BACKGROUND OF THE INVENTION

A video encoding system is illustrated schematically in FIG. 1. The video encoding system 10 receives a sequence of frames from a video source 1. The sequence of frames may be progressive or interlaced. Illustratively, a progressive sequence comprises 30 frames per second. In the case of an interlaced sequence, each frame comprises two fields. An even (top) field comprises the even numbered rows and an odd (bottom) field comprises the odd numbered rows. Thus, in the case of an interlaced sequence, there are 60 fields per second. The present invention is particularly concerned with an interlaced video sequence.

The video source 1 may be any source of a digital video signal such as a video camera or a telecine machine. A telecine machine converts a film comprising 24 frames per second into a 60 fields per second digital video signal using 3:2 pull down. The 3:2 pull down technique provides for generating two video fields and three video fields for alternating film frames. For a film frame which is converted into three video fields, the third field is a repeat of the first field. The 3:2 pulldown technique is discussed in greater detail below in connection with FIG. 2.

The video encoder system 10 includes a video capture buffer 30 for capturing the input video sequence and an inverse telecine circuit 40. The inverse telecine circuit detects repeat fields in the input video sequence and causes these fields to be dropped so as not to waste valuable encoder resources for compressing repeat fields.

The video encoder system 10 includes a preprocessor circuit 14, a preprocessor buffer 15 for buffering video-fields to be processed by the preprocessing circuit, a video compression circuit 16, a rate buffer 18 and a rate controller 20.

The video compression circuit 16 receives a video signal from the preprocessor circuit 14 in the form of a sequence of frames or sequence of fields and outputs a compressed digital video bit stream.

Preferably, the compressed digital video bit stream output by the video compression circuit 16 complies with the syntax specified in the MPEG-2 standard. Compression circuits which generate an MPEG-2 compliant bit stream are well known.

The MPEG-2 compliant bit stream generated by the video compression circuit 16 is stored in a rate buffer 18. The bit stream is then transmitted via a transmission channel 19 to one or more decoders which decode the received bit stream. Alternatively, the bit stream may be transmitted to a storage device such a as CD-ROM or other memory.

The rate controller 20 controls the number of bits allocated by the video compression circuit 16 to the frames to be encoded. The rate controller 20 allocates bits to the frames to be encoded in such a way so as not to exceed the bandwidth in the channel 19 assigned to the encoder system 10 and so as to maintain certain limits on the occupancy of the encoder buffer 18. This is turn prevents exceptions (overflow or underflow) at the decoder buffer where the bit stream is received after transmission by the channel 19 or when the bit stream is read from a memory in which it has previously been stored.

The preprocessor circuit 14 processes the video signal so that it may be compressed by the video compression circuit 16. For example, the preprocessor circuit may change the format of each frame (number of horizontal pixels and number of vertical pixels) to meet parameters specified by the video compression circuit 16. In addition, the preprocessor circuit can detect scene changes or other changes which increase compression difficulty. A scene change increases the amount of bits required because predictive encoding cannot initially be used. If the preprocessor circuit 14 detects a scene change, this information is communicated by the preprocessor circuit 14 to the video compression circuit 16 and rate controller 20. A fade (continuous decrease or increase in luminance level to or from black over several time frames) can also cause difficulties for the video compression circuit because it can cause a failure in motion compensated prediction. The preprocessor circuit 14 can detect and inform the video compression circuit 16 of a fade so that the video compression circuit can take precautions.

Another function performed by the preprocessor circuit 14 is to determine a total activity and a masking a activity for each macroblock in each frame. The total activity and masking activity are used in the video compression process. The functions of the preprocessor circuit are described in greater detail in the above identified related application.

A large number of video signals to be compressed are derived from commercial motion picture film. In this case, the video source 1 is a telecine machine. Such film typically has 24 frames per second. The transfer of imaging information from 24 frames per second film to 30 frame (i.e., 60 field) per second interlaced video is typically performed by a telecine machine using storage tube scanning, fly spot scanning, or line storing with a frame store and digital sequencing.

The frame rate conversion scheme implemented by a telecine machine for converting between 24 frame per second film and 60 field per second video is known as 3-2 pulldown. An illustration of 3-2 pulldown is provided in FIG. 2. FIG. 2 shows a sequence of film frames at 24 frames per second. These frames are labeled A, B, C, D, E, F . . . . FIG. 2 also shows a sequence of video fields derived from the frames A, B, C . . . using the 3-2 pulldown technique. According to the 3:2 pulldown conversion, for successive film frames, the telecine machine alternates between generating three video fields and two video fields. In case three video fields are generated for a film frame, the third field is a repeat of the first field. Thus, in FIG. 2, the first video field $a_1$ is an odd field derived from the first film frame A, the second video field $a_2$ is an even field derived from the film frame A, the third video field $a_3$ is an odd field which is the same as $a_1$ and is derived from the film frame A. The fourth video field $b_1$ is an even field derived from the film frame B and the fifth video field $b_2$ is an odd field derived from the film frame B. The sixth, seventh, and eighth video fields, $c_1$, $c_2$, $c_3$, are even, odd, and even, respectively, and are derived from the film frame C, with $c_3$ being a repeat of $c_1$. The ninth and tenth video fields $d_1$, $d_2$ are odd and even, respectively and are derived from the film frame D. Thus, the number of fields per frame of video follows the pattern 3.2.3.2.3.2. . . . . . . . . This pattern is known as the 3:2 pulldown pattern.

For a variety of circumstances, the 3.2.3.2.3.2. . . . pattern may be interrupted. For example, sometimes there may be edit where a new film segment is combined with an old film segment in which case. the pattern is:

3,2,3,2,3,3,2,3,2 . . .

The edit occurs where indicated by the arrow.

In another situation. conventional video can be "spliced" into the 3:2 pulldown video sequence to form a pattern which looks like ... 3, 2, 3, 2, 3, 2   2, 2, 2, 2, 2, ..., 2, 2   3, 2, 3, 2, 3, 2 ...
from film              video                      from film This situation occurs when a commercial is inserted into 3:2 pulldown pattern derived from film.

In other situations. there can be a purposeful deviation from the conventional 3:2 pulldown pattern to produce an eye appealing pan. Moreover. if slow motion is desired there may be repeat fields for optical reasons as well as repeat fields resulting from telecine machine operation.

The purpose of inverse telecine processing may be viewed as grouping fields into two-field frames and three-field frames by detecting repeat fields in the three field frames. The repeat fields in the three-field frames are then dropped to save compression resources.

Accordingly, it is an object of the invention to provide an efficient technique and system for detecting and discarding repeat fields in a video-sequence to be encoded. More specifically, it is an object of the invention to provide a repeat field detection system and method which utilizes a minimum number of field buffers for storing the input fields for repeat field detection.

SUMMARY OF THE INVENTION

In accordance with a preferred embodiment of the invention, a method and system for performing inverse telecine processing requires a minimum amount of input memory capacity. Specifically, the inventive inverse telecine processing technique requires only first and second dual field buffers. The first dual field buffer has a first even buffer (1E) and a first odd buffer (1O). The second dual field buffer has a second even buffer (2E) and a second odd buffer (2O). The input video sequence to be processed comprises a sequence of video fields of alternating even and odd parity. The even fields of the input sequence are written into the even buffers of the two dual field buffers on an alternating basis and the odd fields of the input sequence are written into the odd buffers of the dual field buffers on an alternating basis. This order is changed (i.e., toggled) when a repeat field is detected. The repeat field is dropped by writing over it with the next field of the same parity in the input sequence.

BRIEF DESCRIPTION OF THE DRAWING

FIGS. 4A and 4B form a chart illustrating the operation of the input buffer and inverse telecine circuit of FIG. 3.

DETAILED DESCRIPTION OF THE INVENTION

Figure 1:
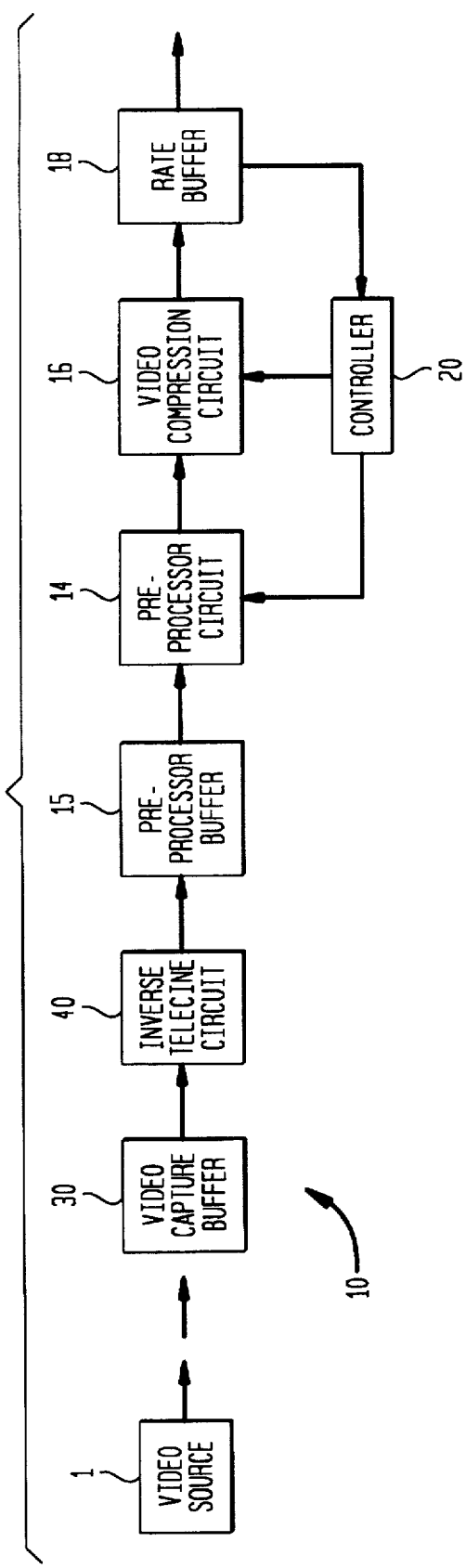
FIG. 1 schematically illustrates a video encoding system.
Figure 2:
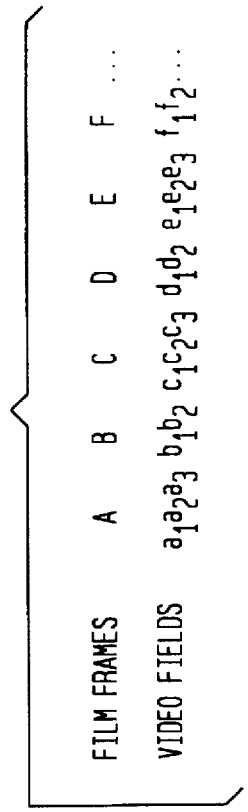
FIG. 2 schematically illustrates the 3:2 pulldown technique.
Figure 3:
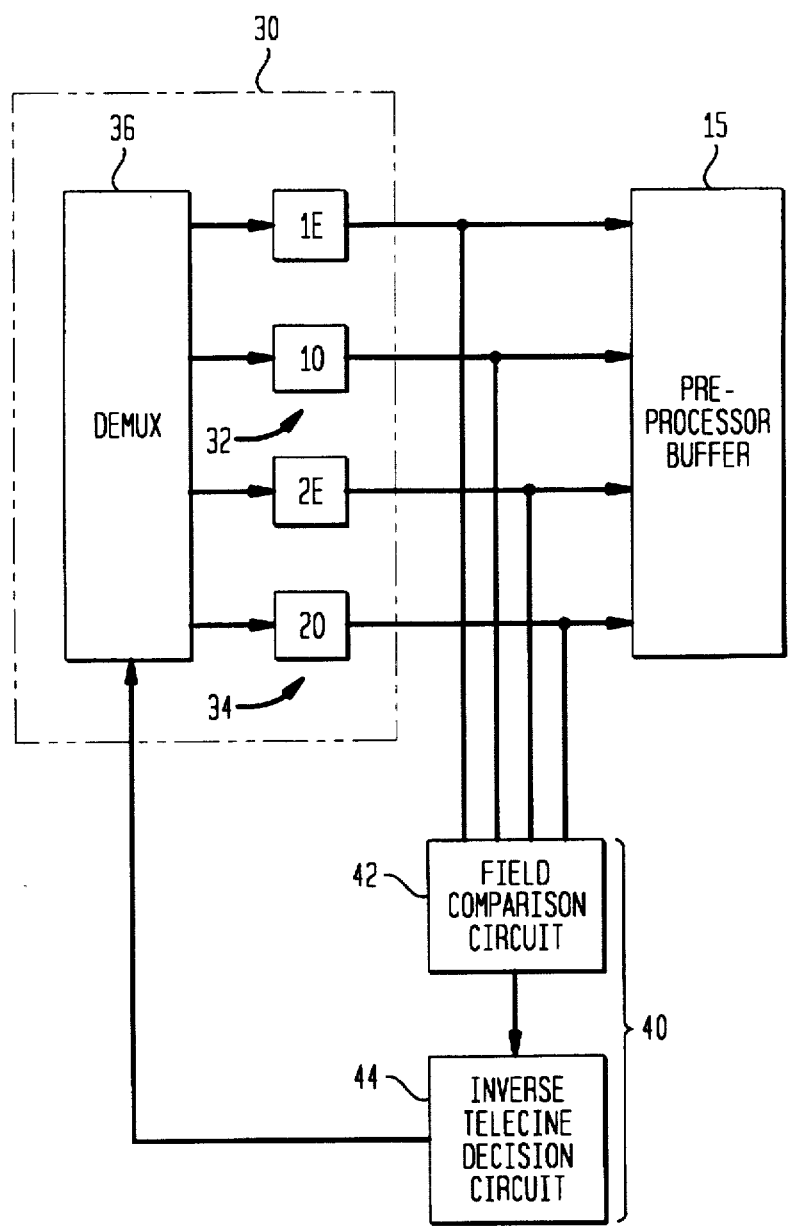
FIG. 3 illustrates an input buffer for an inverse telecine circuit as well as the inverse telecine circuit itself according to the invention.

A video capture buffer and inverse telecine circuit which operates in accordance with the present invention is schematically illustrated in FIG. 3.

The video capture buffer comprises a first dual field buffer 32 and a second dual field buffer 34. The first dual field buffer 32 comprises a first even field buffer labeled 1E and a first odd field buffer labeled 1O. The second dual field buffer 34 comprises a second even field buffer labeled 2E and a second odd field buffer labeled 2O.

A demultiplexer 36 receives an input sequence of video fields from a video source (e.g., a telecine machine) and outputs each field to a particular one of the input buffers 1E, 1O, 2E, 2O. The particular buffer into which each field in the input sequence is written is discussed below.

The inverse telecine circuit 40 comprises the field comparison circuit 42 and the inverse telecine circuit 44. The field comparison circuit 42 compares the fields in buffers 1E and 2E and also compares the fields in buffers 1O and 2O. The comparisons are of fields of the same polarity because in a 3:2 pull down sequence, repeat fields in a 3-field frame are usually separated by a non-repeat field. Based on the comparison, the inverse telecine circuit determines if the even buffers 1E and 2E contain a repeat field and if the odd buffers 1O and 2O contain a repeat field.

In an illustrative embodiment of the invention, the field comparison circuit 42 operates as follows. For each macroblock of pixels in a pair of fields to be compared, the field comparison will comprise a pixel-by-pixel subtraction and summing of the absolute differences over a macroblock. These individual macroblock scores are transmitted to the inverse telecine decision circuit 44 in order to make the repeat field detection decision.

The repeat field detection decision is based on the distribution of macroblock scores. A comparison of a particular field with a repeat field will result in a large number of low scores. A comparison of the same particular field with a different field will result in a distribution with a large number of higher scores. The detection of repeat fields enables the input video sequence to be grouped into two-field and three-field frames.

When the inverse telecine decision circuit detects a repeat field, the repeat field is dropped. In accordance with the present invention, this is accomplished by writing over the repeat field in the appropriate one of the buffers 1E, 1O, 2E, 2O with a new field in the input video sequence. Such a write over may occur in response to an indication signal transmitted from the inverse telecine decision circuit 44 to the demultiplexer 36.

The video fields in the buffers 1E, 1O, 2E, 2O are grouped into frames as indicated above are transferred to the preprocessor buffer 15 for processing in the preprocessor circuit prior to compression.

While the inverse telecine circuit 40 has been depicted as hardware in FIG. 3, in some embodiments of the invention, the field comparison function and inverse telecine decision function may be implemented using a central processing unit, controller, or other circuit which has been programmed with software to carry out these functions.

In addition, it should be noted that it is possible to make the repeat field detection decision using less than all the data of a given field. Thus, while a field consists of one luma and two chroma components. it is necessary to only capture the luma components for the inverse telecine decision. In addition, to reduce the amount of data which needs to be processed, the field comparison and repeat field detection processing can be carried out using decimated versions of the fields in particular circumstances.

The operation of the video capture buffer 30 and inverse telecine circuit is illustrated in greater detail in connection with the timing diagrams of FIGS. 4A and 4B. The number at the left hand side of each line in FIGS. 4A and 4B indicates a field time period.

In FIGS. 4A and 4B, the first column lists the film source fields. These fields are labeled S1A, S1B, S2A, S2B, . . . . in accordance with the 3:2 pull down sequence. Thus, the frame S2 comprises three fields S2A, S2B, S2A. It can be seen that the field S2A is a repeat field. In FIGS. 4A and 4B, capital letter A designates a field of even parity and a capital letter B designates a field of odd parity.

The second column lists the video source fields V1A, V1B, V2A, V2B, . . . . The correspondence between particular film source fields and particular video source fields can easily be obtained from the table.

The third column indicates into which input buffer 1E, 1O, 2E, 2O, each source field is written.

The fourth column indicates the grouping of fields into two-field frames or three-field frames in particular field time periods. Each frame (e.g., F1, F2, etc.) is described by the input buffers which contain the fields of that frame. No inverse telecine decision is made in the field time periods marked wait.

The fifth column indicates the transfer of fields to the preprocessing buffer which take place in particular time periods. The frames (e.g., P1, P2 etc.) which are transferred to the preprocessing buffer are described by the input buffers which contain the field of that frame.

Column 6 contains certain comments.

Column 7 indicates the phase. Phase 0 indicates the buffers are filled in the order 1E, 1O, 2E, 2O. Phase 1 indicates the buffers are filled in the order 2E, 2O, 1E, 1O. The term "toggle" indicates a phase switch.

In field time period (1), field V1A is written into buffer 1E.

In field time period (2), field V1B is written into buffer 1O.

In field time period (3), field V2A is written into buffer 2E. No 3:2 decision is made as indicated by the word "wait". The contents of 1E and 1O are transferred to the preprocessing buffer as a frame P1. There is no possibility of one of these fields being a repeat field because only the third field of a frame can be a repeat field.

In field time period (4), field V2B is written into 2O, and a decision is made to group the fields in the buffers 1E and 1O into a two-field frame F1.

In field time period (5), field V3A is written into 1E, there is no 3:2 decision and the contents of 2E and 2O are transferred to the preprocessing buffer as frame P2.

In field time period (6), field V3B is written into 1O. A decision is made to group the three fields in 2E, 2O, 1E into a three-field frame F2, wherein 1E contains a repeat field 3A. The phase is toggled, i.e., the phase switches from 0 to 1. This means that the field V3A in buffer 1E is dropped by writing over it with the next field in the input sequence with the same parity. Thus, in field time period (7), field V4A is written into buffer 1E (rather than buffer 2E if phase 0 were to be maintained).

The phase (1) is maintained until field time period (12). In field time period 12, a decision is made to group the contents of 2O, 2E, 1O into a three-field frame, wherein buffer 1O contains the repeat field V5B. At this point, the phase is toggled from 1 to 0. The repeat field V5B in buffer 1O is dropped by writing over it with next field of the same parity V6B. (If the phase were not toggled, field V6B would be written into buffer 2O rather than 1O). Toggling also takes place at field time periods (15), (24), (29).

In field time period (31), field V16A (S13) is written into buffer 1E. The field V16A (S13A) is an orphan field. The orphan field perturbs the 3:2 pulldown sequence. The fields S13A (V16A) and S14B will be grouped as a two-field frame and S14A will not be dropped since S13A and S14A are not duplicates. The interlaced frame made of fields S13A and S14B is passed to the preprocessor buffer.

As a result of the grouping of S13A and S14B, S14A is orphaned and combined with S15B to form P14 as another interlaced frame. The first three-field frame to occur rectifies this situation. This is the source frame S15 made up of the field S15B, S15A, S15B. The first copy of S15B is combined with the orphaned S14A to form a frame as described above. The second copy of S15B is not dropped but rather is combined with S15A and encoded as a two-field frame. At this point, the conventional 3:2 phase is recovered.

During the field time periods marked "STALL" in FIGS. 4A and 4B, opposite parity field comparisons may be performed. This allows orphan fields to be detected and the 3:2 phase to be recovered after only one interlaced frame.

Finally, the above-described embodiments of the invention are intended to be illustrative only. Numerous alternative embodiments of the invention may be devised by those skilled in the art without departing from the spirit and scope of the following claims.

The claimed invention is:

1. A method for performing inverse telecine processing on a sequence of video fields of alternating even and odd parity comprising the steps of:

writing data representative of said even fields in said video sequence into first and second even video field buffers on an alternating basis, and writing data representative of said odd fields in said video sequence into first and second odd video field buffers on an alternating basis, when an inverse telecine decision circuit determines that one of said even or odd fields is a repeat field, the order in which the fields of said video sequence are written into the buffers is toggled, so that the next field of said video sequence with the same parity as said repeat field is written over the repeat field so as to cause the repeat field to be dropped.

2. A system for performing inverse telecine processing on a sequence of video fields of alternating even and odd parity comprising:

a first dual field buffer including a first even buffer for storing data representative of a first even video field in said sequence and a first odd buffer for storing data representative of a first odd video field in said sequence;

a second dual field buffer including a second even buffer for storing data representative of a second even video field in said sequence and a second odd buffer for storing data representative of a second odd video field in said sequence;

a comparator connected to said first and second dual field buffers for comparing said first and second even video fields and for comparing said first and second odd video fields;

an inverse telecine decision circuit responsive to said comparator for selectively determining if one of said first and second even video fields is a repeat field and if one of said first and second odd fields is a repeat field, said system dropping a repeat field by toggling the order in which the fields of said video sequence are written into the buffers, writing over said repeat field with the next field in said video sequence with the same parity as the repeat field.

\* \* \* \* \*